(12) United States Patent
Andreoli

(10) Patent No.: US 9,457,960 B2
(45) Date of Patent: Oct. 4, 2016

(54) APPARATUS FOR ASSISTING THE MOVEMENT OF A CHAIN

(71) Applicant: REXNORD FLATTOP EUROPE S.R.L., Correggio (IT)

(72) Inventor: Andrea Andreoli, Modena (IT)

(73) Assignee: REXNORD FLATTOP EUROPE S.R.L., Correggio (RE) (IT)

( * ) Notice: Subject to any disclaimer, the term of this patent is extended or adjusted under 35 U.S.C. 154(b) by 0 days.

(21) Appl. No.: 14/427,372

(22) PCT Filed: Sep. 13, 2013

(86) PCT No.: PCT/EP2013/069041
§ 371 (c)(1),
(2) Date: Mar. 11, 2015

(87) PCT Pub. No.: WO2014/041133
PCT Pub. Date: Mar. 20, 2014

(65) Prior Publication Data
US 2015/0353288 A1 Dec. 10, 2015

(30) Foreign Application Priority Data
Sep. 14, 2012 (IT) .............................. MI2012A1515

(51) Int. Cl.
*B65G 21/20* (2006.01)
*B65G 23/14* (2006.01)
*B65G 17/08* (2006.01)

(52) U.S. Cl.
CPC ............. *B65G 23/14* (2013.01); *B65G 17/086* (2013.01); *B65G 21/20* (2013.01)

(58) Field of Classification Search
CPC ...................................................... B65G 21/20
USPC ..................... 198/779, 836.1, 837
See application file for complete search history.

(56) References Cited

U.S. PATENT DOCUMENTS 4,067,439 A * 1/1978 Janitsch ................. B65G 23/36
198/830

(Continued)

FOREIGN PATENT DOCUMENTS

CN 1336896 A 2/2002
CN 101100235 A 1/2008

(Continued)

OTHER PUBLICATIONS

PCT International Search Report and Written Opinion, PCT/EP2013/069041, Oct. 15, 2013.

(Continued)

*Primary Examiner* — Douglas Hess
(74) *Attorney, Agent, or Firm* — Quarles & Brady LLP

(57) ABSTRACT

An apparatus for assisting the movement of a transport chain (105, 405) in correspondence of a curve of a transport path of an articles conveyor (100, 400) is proposed. The transport chain comprises a plurality of modules ($120_{i-1}$, $120i$, $120_{i+1}$; $420_{i-1}$, $420i$, $420_{i+1}$); each module being coupled to adjacent modules in order to form a loop. Moreover, top surfaces (122; 422) of the coupled modules define a transport surface (124; 424) for supporting the articles to be transported and a side surface (315; 540) define a chain side surface of the chain. The apparatus comprises at least one auxiliary chain (135, 435) arranged in a curvilinear running region (130, 430) corresponding to the transport path curve. In the solution according to an embodiment of the present invention, said auxiliary chain comprises a plurality of contact elements (235, 535). Each contact element is adapted to laterally adhere to the transport chain, part of said plurality of contact elements simultaneously laterally adhering to a portion of said chain running trough the curved portion, in such a way to determine a same running speed for the transport chain and the auxiliary chain.

15 Claims, 7 Drawing Sheets

(56) References Cited

U.S. PATENT DOCUMENTS

| | | | | |
|---|---|---|---|---|
| 6,298,982 | B1* | 10/2001 | Layne | B65G 15/02 198/831 |
| 6,386,355 | B1* | 5/2002 | Willems | B65G 17/061 198/831 |
| 6,471,046 | B2* | 10/2002 | Layne | B65G 17/086 198/831 |
| 6,578,704 | B1* | 6/2003 | MacLachlan | B65G 17/08 198/778 |
| 6,964,333 | B2* | 11/2005 | Ledingham | B65G 21/16 198/836.3 |
| 7,303,066 | B2* | 12/2007 | Rumer | B65H 23/02 198/831 |
| 7,604,111 | B2* | 10/2009 | Zmaj | B65G 21/22 198/831 |
| 7,637,368 | B2* | 12/2009 | Andreoli | B65G 21/2054 193/35 C |
| 8,011,496 | B2* | 9/2011 | Seger | B65G 21/16 198/778 |
| 8,162,132 | B2* | 4/2012 | Muller | B65G 19/30 198/779 |
| 8,997,976 | B2* | 4/2015 | Torra | B65G 15/00 198/837 |
| 9,139,371 | B2* | 9/2015 | De Angelis | B65G 21/18 |
| 2010/0294626 | A1 | 11/2010 | Muller | |

FOREIGN PATENT DOCUMENTS

| | | |
|---|---|---|
| CN | 201358065 Y | 12/2009 |
| CN | 101878170 A | 11/2010 |
| DE | 301823 C | 11/1917 |
| DE | 3149555 A1 | 6/1983 |
| GB | 2127372 A | 4/1984 |

OTHER PUBLICATIONS

The State Intellectual Property Office of the People's Republic of China, First Office Action and Search Report, Application No. 201380058890.5, Mar. 2, 2016 [English Language Translation Only].

* cited by examiner

APPARATUS FOR ASSISTING THE MOVEMENT OF A CHAIN

CROSS-REFERENCE TO RELATED APPLICATIONS

This application represents the national stage entry of PCT International Application No. PCT/EP2013/069041 filed Sep. 13, 2013, which claims the benefit of Italian Patent Application No. MI2012A001515 filed Sep. 14, 2012, the disclosures of which are hereby incorporated by reference in their entirety for all purposes.

The invention relates generally to the field of conveyors of articles. More particularly, the invention regards an apparatus for assisting the movement of a chain (or belt) for conveying articles.

In conveyors of articles the use of chains of polymeric material (i.e., in plastic material such as polyamide or polyoxymethylene POM for example) for supporting and carrying items is known. Typically, such chains comprise a plurality of unitary modules interconnected to form a loop, which is arranged on a metal support structure and is moved by means of an appropriate mechanical moving system. In detail, the chains move with an engagement surface disposed on a housing, which is suitable to leave exposed a conveying surface of the chain on which are placed the articles to be transported. Furthermore, the side surfaces of the chains (being opposite one another and separating the engagement surface from the transport surface) are typically enclosed by side walls of the support structure.

During operation of the articles conveyor, in correspondence of the curved sections, the side surfaces of the transport chain come into contact with the side walls of the support structure.

This dynamic contact entails the development of friction forces, or simply friction, between the side surfaces of the chain and the side walls of the support structure, which in its turn produce undesirable phenomena such as heat development on the surfaces in sliding contact and wear-out thereof. The increase of the friction coefficient resulting from the increasing in contact temperature may cause premature deterioration of the chain, up to determine the breaking thereof. In particular, the friction between the side surfaces of the chain and the side walls of the support structure causes a rising in the temperatures of both, in correspondence of portions thereof contacting each other. Such rise in temperature causes a change of the friction coefficient, due to changes in the physical characteristics of the materials constituting the side surfaces of the chain and the side walls of the support structure. Consequently, the friction grows in intensity up to reach a condition of constant temperature and high friction. Moreover, it may happens that the temperature achieved is high enough to cause permanent alterations in the chain and/or in the support structure (for example, deformations, such as corrugations, in the side portions of the chain), also of such a magnitude as to affect the operation of the articles conveyor (for example, in the case of a fusion of one or more portions of the chain).

Sometimes, local variations of speed may also occur producing longitudinal pulsations on the chain in the direction of its motion, linked to phenomena of consecutive development of friction and friction loss (called slip-stick phenomena). Such phenomena can affect the transport of articles (e.g., in the case of tall and slim articles, i.e. with a small contact surface), which may be subject to falls for instability. In addition, the friction forces increase the effort undergone by a motor that moves the same.

Generally the chain is subject to a linear traction, typically imprinted at one end of the path of the chain by means of a traction motor-pinion system, actuated for example by an electric geared motor; therefore, in the curved portion of the conveyor belt, a component of traction is transversal to the inner side wall of the support structure and pushes the chain against the same causing the disadvantageous phenomena mentioned above.

Such phenomena are exacerbated in the case of particularly long curvilinear and uphill portions. A typical example is the case of spiral-geometry conveyors having a vertical development, which are designed to ensure a continuous flow of products, for a predetermined period of time, towards process machines that for production efficiency reasons should never be stopped for the occasional failures of upstream processing machines. Such conveyors include one or more spiral elevators (portions of articles conveyor having a spiral shape with a constant radius), generally used to form buffer or accumulation regions in an articles conveyor, which are aimed at dynamic accumulation of product. In these cases, a tensile force, developed by the motor of the chain to drag the latter, includes the sum of the contributions of sliding friction developed between the side surfaces of the chain in contact with the support structure of the articles conveyor, in addition to the force necessary for lifting the articles transported. Furthermore, the greater the tensile force required to drag the chain is, the greater will be its transversal component that, due to the dynamic sliding friction coefficient between the chain and the support structure of the articles conveyor, generates its reaction to the advancement of the chain.

In order to try to reduce the occurrence of the disadvantageous phenomena mentioned above, in the art is known to provide an apparatus for assisting the sliding of the side surfaces of a chain in order to reduce the frictional forces to which the same may be subject. For example, in the case of spiral portions arranged at the centre thereof a single rotating roller of such size as to be simultaneously in contact with each side surface portion of the chain inside the spiral is known. The rotating roller rotates at the running speed of the chain thereby reducing the friction forces on the side surface of the chain inside the curve. However, the rotating roller has not negligible footprint and weight; moreover, a motor capable of developing a high-intensity torque is needed for moving the rotating roller (therefore, the rotating roller turns out to be a particularly expensive solution).

The patent application U.S. 2010/0294626 describes a deflection apparatus for an articles conveyor having a central body and a roller body that slide around the central body. The roller body has a plurality of rollers which are guided on an idle rollers path included in the main body. The Applicant has found that this apparatus can not completely overcome the disadvantageous phenomena described above. In fact, although the interaction between the roller body and the belt of the articles conveyor in general reduce friction phenomena, the deflection apparatus is not able to suppress the compression/extent and local variations in speed of the transport chain. In fact, the roller body slides (dragged by the transport chain) within the rollers path at a speed substantially halved with respect to the speed of the transport chain due to the rolling of the rollers on the central body (which is immobile). Such difference between the speed of the roller body and the speed of the transport chain ease the occurrence of the undesirable phenomena of compression/extension and speed changes of the transport chain.

In general terms, the solution according to one or more embodiments of the present invention has the aim to provide an apparatus for assisting the movement of a transport chain (or belt) able to suppress, or at least to effectively reduce the friction arising between the transport chain and the support system of an articles conveyor.

In particular, one or more aspects of a solution according to specific embodiments of the present invention are indicated in the independent claims, with advantageous features thereof that are indicated in the dependent claims.

More specifically, an aspect of a solution according to an embodiment of the present invention provides an apparatus for assisting the movement of a transport chain in correspondence of a curve of a transport path of an articles conveyor. The transport chain comprises a plurality of modules; each module being coupled to adjacent modules in order to form a loop. Moreover, top surfaces of the coupled modules define a transport surface for supporting the articles to be transported and a side surface define a chain side surface of the chain. The apparatus comprises at least one auxiliary chain arranged in a curvilinear running region corresponding to the curve of the transport path. In the solution according to an embodiment of the present invention, said auxiliary chain comprises a plurality of contact elements. Each contact element is suitable to laterally adhere to the transport chain, part of said plurality of contact elements simultaneously laterally adhering to a portion of said chain running trough the curved portion, in such a way to determine a same running speed for the transport chain and the auxiliary chain.

A further aspect of a solution according to an embodiment of the present invention provides an articles conveyor comprising such apparatus.

These, and other, features and advantages of the solution according to the present invention will be better understood with reference to the following detailed description of an embodiment thereof, provided purely by way of non-limiting example, to be read in conjunction with the accompanying figures. In this respect, it is expressly understood that the figures are not necessarily to scale and that, unless otherwise indicated, they intend simply conceptually illustrate the structures and procedures described. In particular:

Figure 1:
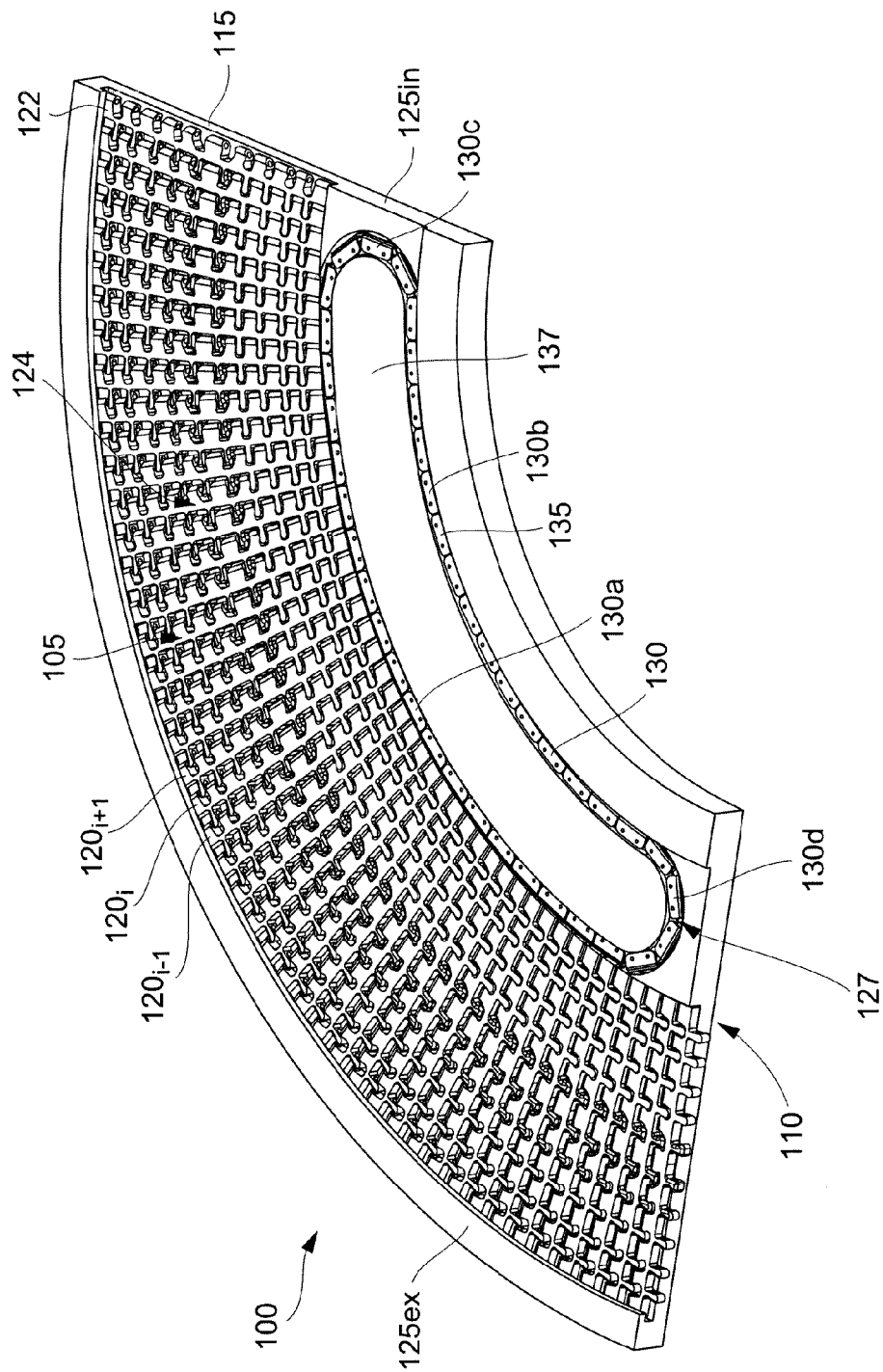
FIG. 1 is an axonometric view of a curved portion of articles conveyor with a mat chain which is implemented in one embodiment of the present invention.

With reference to the Figures, FIG. 1 is an axonometric view of a curved portion of articles conveyor, or more simply conveyor 100, with a transport mat chain 105 which is implemented in one embodiment of the present invention.

The conveyor 100 includes a support structure 110, typically supported at a working height by a plurality of legs, which rest on the ground (not visible in the Figures). The support structure 110 includes a housing 115 designed and arranged so as to provide a path for the chain 105; in other words, supports and guides the chain 105 of the conveyor 100 during its sliding.

The mat chain 105 includes a plurality of chain modules $120i$ (with i=1, ..., N, with N a positive integer; for example, N=100÷1000) formed preferably, though not exclusively, in polymeric material for example, polyamide and/or acetal resin. Furthermore, each module $120i$ is formed in such a way to be coupled to a preceding module $120_{i-1}$ in the chain 105 and, at the same time, to a next module $120_{i+1}$ in the chain 105—with a first module and a last module (not shown in the Figures) of the chain 105 joined together so as to form a closed loop. In particular, each module $120_i$ of the mat chain 105 has an elongated shape more extended along a direction transversal to a running direction of the chain 105 than a direction parallel to the running direction of the chain 105. A top surface 122 of each module $120_i$ combines with the top surfaces 122 of adjacent modules $120_{i-1}$ and $120_{i+1}$ in order to define a substantially continuous transport surface 124 of the chain 105 adapted to support articles to be conveyed.

The support structure 110 also includes an outer side wall $125_{ex}$ and an inner side wall $125_{in}$, which delimit an outer end and an inner end, respectively, of the housing 115 and are adapted to contain the chain 105 within it.

In the solution according to an embodiment of the present invention, in the inner side wall $125_{in}$ an apparatus 127 is integrated comprising a circuit 130, an auxiliary chain 135 and a central region 137.

In greater detail, the chain 135 is disposed within the circuit 130 around the central region 137.

The circuit 130 is substantially formed by a groove formed in the inner side wall $125_{in}$, which defines the central region 137 within the same. The circuit 130 substantially forms a loop of elongated shape with two main portions 130a and 130b with a greater extent which follow the profile of the curved portion of articles conveyor 100 and two secondary portions 130c and 130d with a smaller extent which connect (substantially in the direction transversal to the running direction of the chain 105) the main portions 130a and 130b. Furthermore, the circuit 130 is adapted to contain the auxiliary chain 135.

In particular, the main portion 130a is formed open in such a way to communicate with the housing 115, to which is adjacent (i.e., any dividing element is not provided between the housing 115 and the main portion 130a). Thanks to this, a portion of the auxiliary chain 135 provided in the main portion 130a of the circuit 130 may face towards the housing 115 and come laterally into contact with the chain 105 (as will be described in detail in the following). Advantageously, the contact of the chain 105 with the auxiliary chain 135 eliminates, or at least reduces, a friction force that develops between the chain 105 and the inner wall $125_{in}$ of the support structure 110 (as will be described in greater detail below).

Figure 2A:
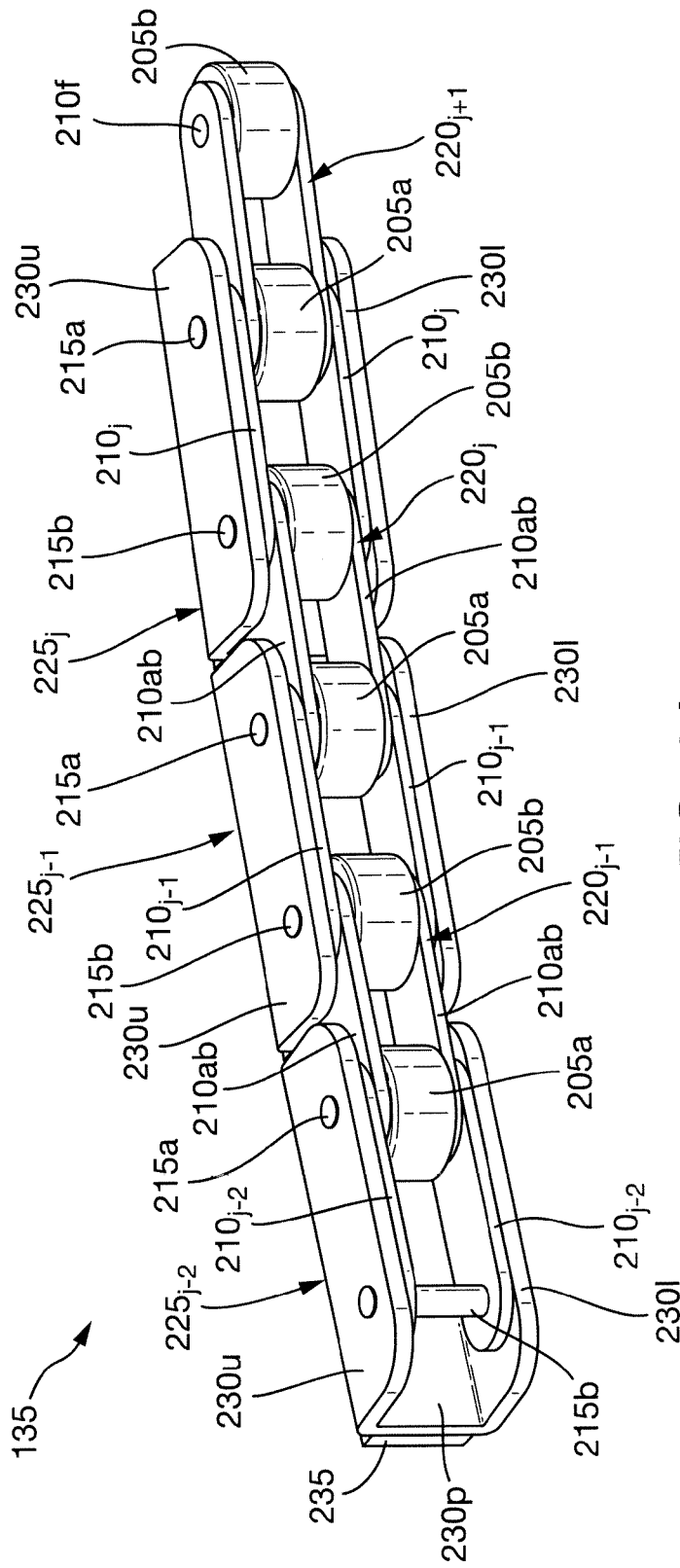
FIGS. 2A and 2B are front and rear axonometric views, respectively, of a portion of the auxiliary chain according to an embodiment of the present invention.
Figure 2B:
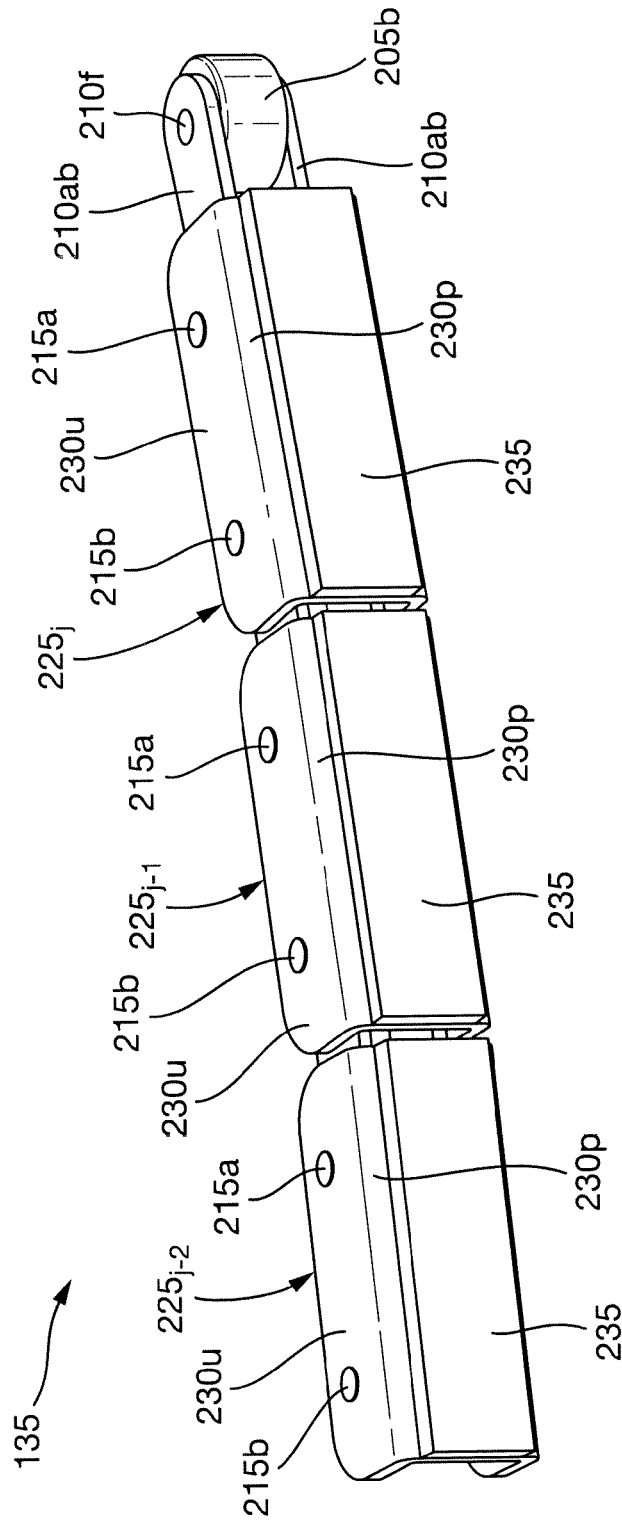

Considering now FIGS. 2A and 2B together, they are axonometric front and rear views, respectively, of a portion of the auxiliary chain 135 according to an embodiment of the present invention.

The auxiliary chain 135 comprises a plurality of coupling elements, such as idle rollers 205a, 205b of a material such to develop a low friction (e.g., thermoplastic resin or metal such as polyamide or bronze, respectively) in contact with the side surface of the central region 137, which acts as a shoulder for the auxiliary chain 135. In particular, each idle roller 205a, 205b has a substantially cylindrical shape and is provided with a through hole formed in a central location of its bases. Moreover, the chain 135 comprises a plurality of bond elements, or meshes $210_j$, 210ab (of a resistant material, such as steel or a suitable polymer); each mesh $210_j$ substantially is a plate with a parallelepiped shape with opposite ends of lesser extent that are rounded and, in correspondence of which, through holes 210f are provided. In addition, the chain 135 includes a plurality of pins 215a, 215b (still of resistant material, such as steel or a suitable polymer) adapted to the insertion in the through hole of the rollers 205a, 205b.

In the example at issue, the chain 135 includes a series of unitary elements $220_j$ (with j=1, . . . , M, with M a positive integer, for example, M=30÷300), wherein each generic unitary element $220_j$ is interconnected with the next unit element $220_{j+1}$ by means of a couple of meshes $210_j$ (as will be described in greater detail below) with a last unitary element (not visible in the Figures) connected to a first unitary element in such a way to close the chain 135.

In particular, each unitary element $220_j$ includes a pair of pins 215a and 215b inserted into the through hole of the corresponding rollers 205a and 205b so that the pins 215a and 215b protrude above and below by the roller 205a and 205b, respectively. A couple of meshes 210ab is coupled to the protruding portions of the pins 215a and 215b. In particular, the pin 215a is inserted in the through holes 210f formed in a first end of the mesh 210ab, while the pin 215b is inserted into the holes 210f formed in the opposite end of the mesh 210ab. Consequently, the roller 205a and the roller 205b are secured together (rigidly) by the couple of meshes 210ab.

The couple of meshes $210_j$ is coupled to the protruding portions of the pin 215b of the unitary element $220_j$ and to the pin 215a of the next unitary element $220_{j+1}$—through respective through holes 210f, in a similar way as described above for the couple of meshes 210ab. In particular, the ends of each mesh $210_j$ are arranged more outwardly along the pins 215b and 215a than the corresponding ends of the meshes 210ab of the unitary element $220_j$ and of the next unitary element $220_{j+1}$ unitary element and in contact with them. Thanks to the structure of the auxiliary chain 135 just described, each unitary element $220_j$ is bounded to the previous unitary element $220_{j-1}$ and to the next unitary element $220_{j+1}$ in the sequence to form a closed loop. At the same time, such a structure of auxiliary chain 135 allows each pair of adjacent unitary elements $220_{j-1}$ and $220_j$ rotating around the pins 215b and 215a, respectively, independently one another.

In the solution according to the present invention, the chain 135 also comprises a plurality of covering elements, or masks $225_j$. Each mask $225_j$ has a substantially "C"-shaped cross section adapted to surround the chain 135 in such a way to leave exposed the rollers 205 on a single side.

In particular, each mask $225_j$ includes a main wall 230p and two mounting walls 230u and 230l all substantially rectangular-shaped. The two mounting walls 230u and 230l extend from edges having the greatest extent of the main wall 230p and towards a direction substantially transversal thereto. Each mask $225_j$ comprises two pairs of through holes 230f—each formed on a mounting wall 230u and 230l—adapted to allow an insertion (above and below the mask $225_j$) of the pin 215b of the unitary element $220_j$ and the pin 215a of the unitary element $220_{j+1}$. It should be noted that each mask $225_j$ is arranged more outwardly along the pins 215b and 215a than the corresponding ends of the mesh $210_j$ and in contact with the latter. The insertion of the pins 215b and 215a into the holes 230f is for example of the snap-fit type (even if different known types of insertion are not excluded); advantageously, this type of insertion allows a simple coupling of each mask $225_j$ to the remaining elements of the chain 135. Preferably, although not exhaustively, it is possible to exploit the engagement of the masks $225_j$ with the pins 215a and 215b in order to prevent an unplugging of such pins 215a and 215b from the holes of the rollers 205a and 205b, of the meshes 210ab and $210_j$, i.e. the masks $225_j$ may be used to hold together the elements of the auxiliary chain 135.

Finally, on the main wall 230p of each mask $225_j$ a contact element 235 is provided (for example, through a process of molding, or gluing), preferably made of elastomeric material. In the example at issue, the contact element 235 has a substantially parallelepiped shape and an extent substantially equal to the extent of the main wall 230p of the mask $225_j$. It should be noted that it is possible to replace worn-out contact elements 235 simply by removing the corresponding masks $225_j$ and replacing them with new ones, thus without the need for replacing the whole auxiliary chain 135 (thus lowering maintenance times and costs).

In further embodiments of the present invention (not shown), each contact element 235 may be removably coupled to the corresponding mask $225_j$ in order to allow substituting worn-out contact element 235 more easily (and cheaply).

Figure 3:
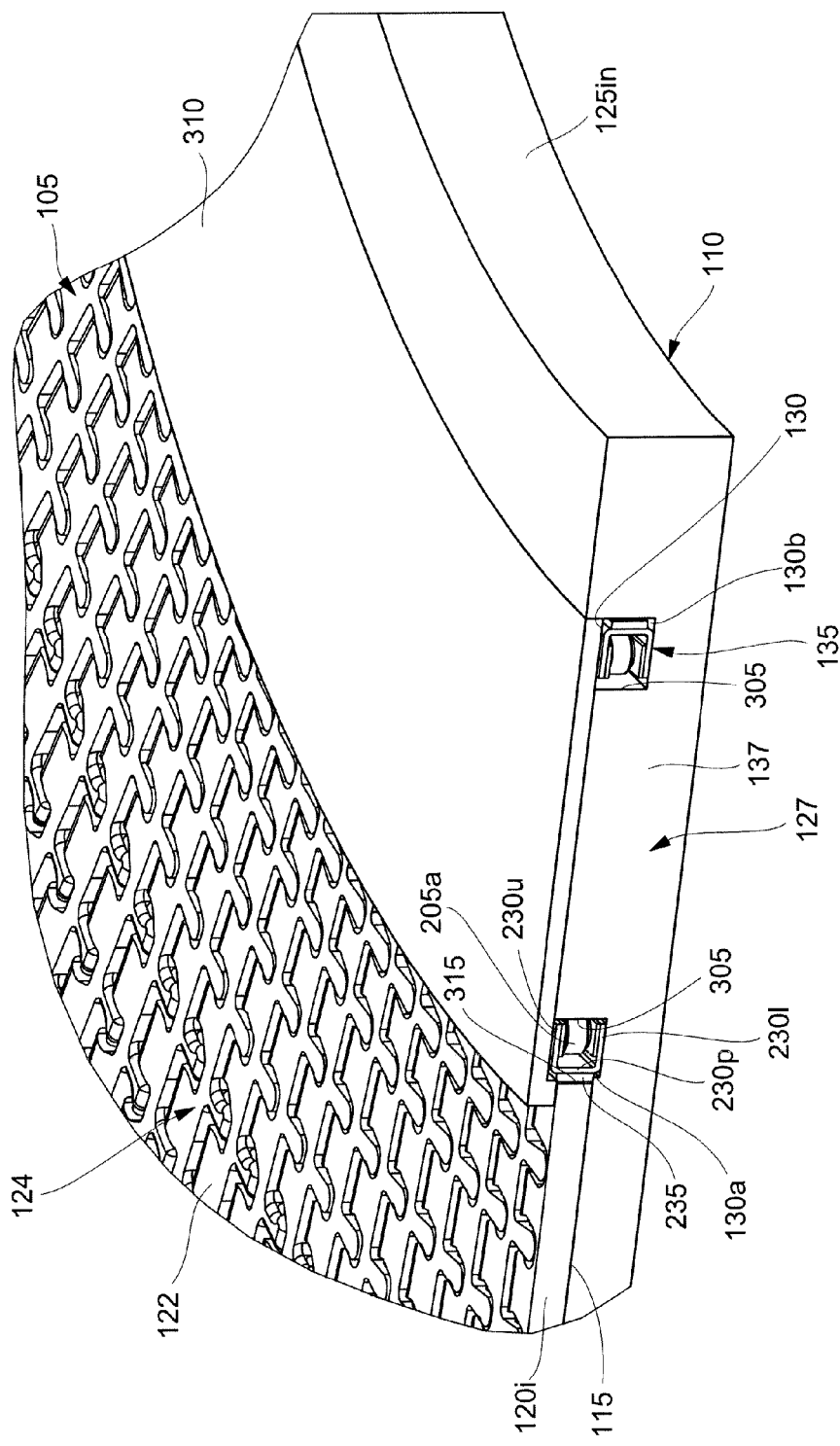
FIG. 3 is a detail of a cross-section of articles conveyor with a mat chain according to one embodiment of the present invention.

Turning now to FIG. 3, which is a detail of a cross-sectional view of the articles conveyor 100, the operation of the articles conveyor 100 according to an embodiment of the present invention will be described.

The auxiliary chain 135 is disposed within the circuit 130 with the contact elements 235 opposite to the central region 137 and with the rollers in contact with a side wall 305 of the central region 137. The circuit 130, the auxiliary chain 135 and the central region 137 are preferably protected from the external environment—in such a way to prevent any access to the circuit 130 by foreign bodies—by means of a cover 310 (e.g., of a resistant material such as a metal or a polymer). Advantageously, the auxiliary chain 135 is arranged (for example, by imposing a suitable mechanical tension to the same) spaced apart both from a bottom portion of the circuit 130 and from the cover 310, in such a way to avoid the occurrence of deleterious phenomena of friction between the auxiliary chain 135 and the circuit 130 and/or the cover 310.

A portion of the auxiliary chain 135 arranged in the main portion 130a of the circuit 130 is in contact with a side surface 315 of the modules $120_i$ and 305 of the lateral part of the central region 137. The contact elements 235 contact the side surface 315 of the modules $120_i$, while all the rollers 205a and 205b contact the side 305 of the central region 137. In particular, substantially the whole surface of each contact element 235 in the main portion 130a adheres to the side surface 315 of the modules $120_i$ of the chain 105 of the portion of the chain 105 running trough the curved portion of the conveyor 100.

The side surfaces 315 of the modules $120_i$ together define a chain side surface of the chain 105. A portion of such chain side surface running trough the curved portion of the conveyor 100 result to be (simultaneously) in contact with (i.e., adhere to) the contact elements 235 of the auxiliary chain 135 in the main portion 130a (with the contact element 235 that contacts at least one side surface 315), thus obtaining a substantially continuous (lateral) contact between the chain 105 and the auxiliary chain 135 in the curved portion of the conveyor 100 as shown in FIG. 1).

During operation, the chain 105 is rotated by one or more actuators (for example, electric motors) of the conveyor 100 and the auxiliary chain 135 moves substantially hand in hand with the chain 105 (i.e., they move together and with a same speed) thanks to the dragging caused by the contact between the side surface the contact elements 315 and 235. At the same time, the rollers 205a and 205b roll on the side wall 305 of the central region 137 and, accordingly, the contact between the rollers 205a and 205b and the side wall 305 generates a force of (rolling) friction of low intensity. In this way, it is possible to obtain a sliding of the auxiliary chain 135 within the circuit 130 substantially at a same speed with which it is dragged the chain 105.

Thanks to the rotation of the auxiliary chain 135 it is possible to substantially reduce a friction force that would develop between the side surface 315 of the chain 105 and the inner side wall $125_{in}$ of the support structure 110. In the embodiment of the present invention, the side surface 315 of the chain 105 engages the contact elements 235 of the auxiliary chain 135 adhering thereto due to a transversal (with respect to the movement of the chain 105) component of the dragging force imparted to the chain 105 by an actuator (not shown in the Figures). Therefore, a point of application of the friction force moves at the contact between the rollers 205a, 205b and the side wall 305 of the central region 137. This together with the substantially continuous (lateral) contact between the chain 105 and the auxiliary chain 135 in the curved portion of the conveyor 100 ensures a uniform reduction of the friction along the whole curved portion of the conveyor 100.

Moreover, thanks to a substantially transversal contact between side surfaces 315 of the modules 120i and the contact elements 235 of the auxiliary chain 135, the auxiliary chain 135 is prevented from oscillating transversally to its movement direction (which could reduce the benefits granted by the auxiliary chain 135).

Advantageously, the rolling of the rollers 205a, 205b on the side wall 305 allows a sliding of the auxiliary chain 135 and, consequently, of the chain 105, characterized by a very small rolling friction coefficient (given by the rolling mentioned above). Therefore, the wear out of the chain 105 does not occur (or is very limited), since portions of the chains 105 and 135 contact each other moving hand in hand (i.e., they move together and with a same speed). Also, the phenomena of compression/extent, or rapid variation of the local velocity, of the modules $120_i$ of the chain 105, better known as longitudinal pulsations due to the known phenomenon of slip-stick, are substantially attenuated, ensuring a more secure and uniform transport of the articles. In addition, in the embodiment according to the present invention the modules $120_i$ of the chain 105 are subject to reduced wear compared to the solutions known in the art and, in general, require a lower maintenance cost and have a useful life longer than the latter.

Figure 4A:
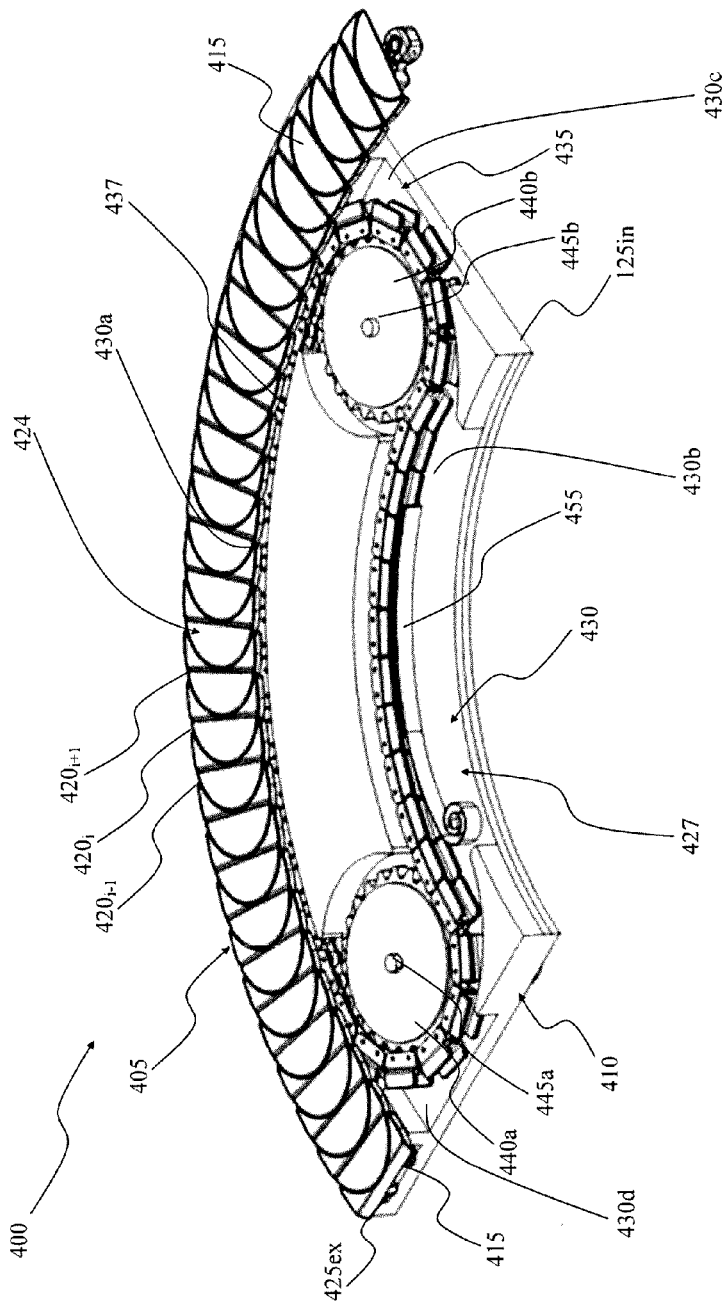
FIGS. 4A and 4B are axonometric views from above and below, respectively, of a curved portion of articles conveyor with a slatted chain in which is implemented another embodiment of the present invention.
Figure 4B:
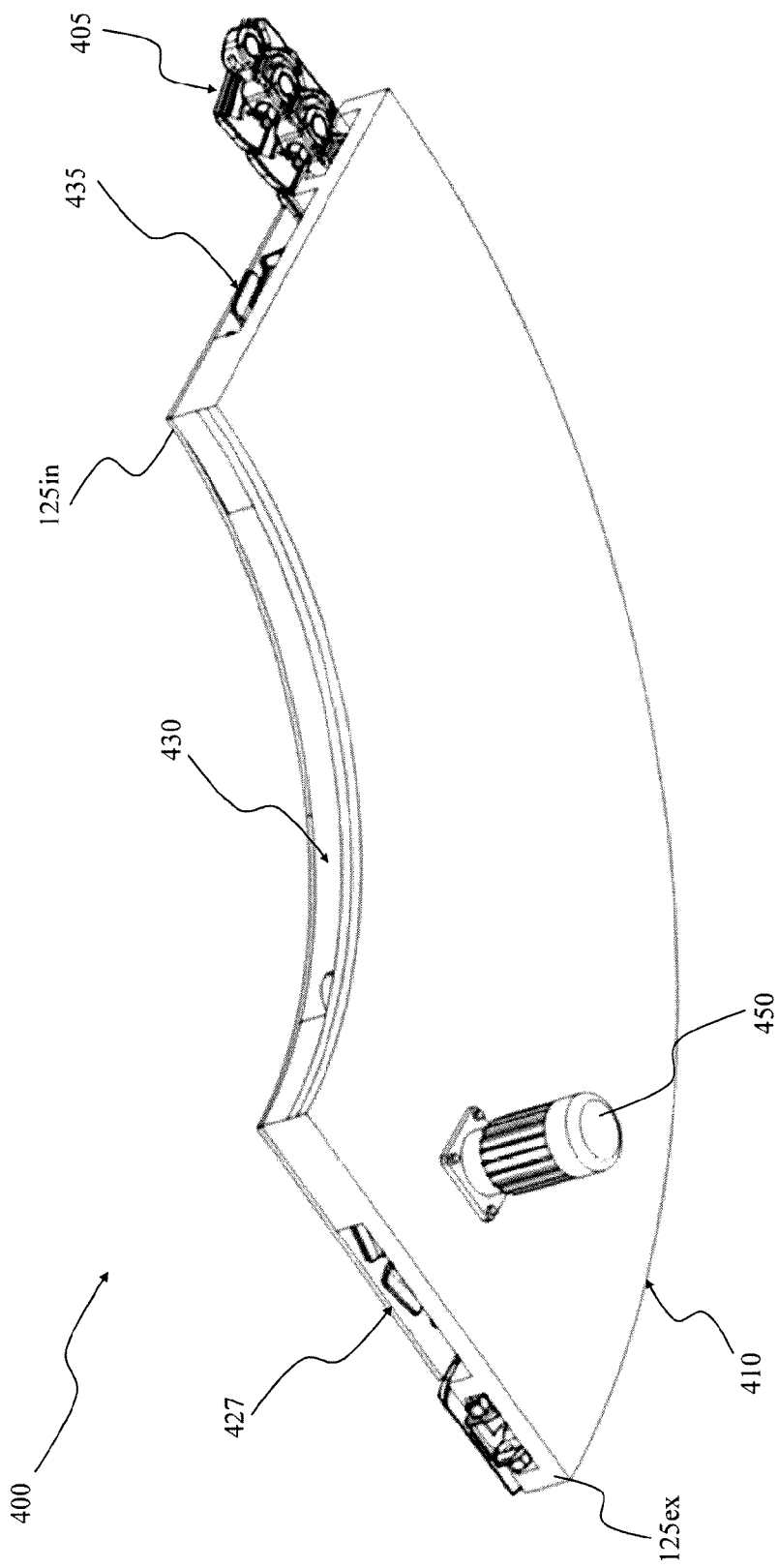

Turning now to FIGS. 4A and 4B, they are axonometric views from above and below, respectively, of a curved portion of articles conveyor 400 with a slatted chain 405 in which is implemented another embodiment according to the present invention.

In the following, elements corresponding to elements previously described are indicated with the same or similar references and their explanation is not repeated for brevity.

The carrier 400 differs from the conveyor just described in what follows.

Even the chain 405 comprises a plurality of modules $420_i$ (with i=1, . . . , N, with N a positive integer, for example, N=100÷1000) of chain formed preferably, though not exclusively, in polymeric material—for example, nylon or acetal. Each module $420_i$ is hinged to a preceding module $420_{i-1}$ in the chain 405 and, at the same time, to a next module $420_{i+1}$ in the chain 405—with a first module and a last module (not shown in the Figures) joined together. In particular, each module $420_i$ of the slatted chain 405 has a more elongated shape extended along a direction parallel to the running direction of the chain 405 in comparison to a direction transversal to the running direction of the chain 405. The slatted chain 405 is adapted to the transportation of articles of limited cross section (e.g., bottles) with respect to articles transported by the mat chain described above. Also in this case, a top surface 422 of each module 420i combines with the top surfaces 422 of adjacent modules $420_{i-1}$ and $420_{i+1}$ in order to define a substantially flat and continuous transport surface 424 of the slatted chain 405 adapted to support articles to be conveyed.

In an inner side wall 425in of a support structure 410 (similar to the support structure previously described) an apparatus 427 comprising a running space 430 (preferably wider than the circuit described above), an auxiliary chain 435 and a central region 437 is integrated. The running space 430 allows the sliding of the auxiliary chain 435 around the central region 437, which is delimited by the running space 430. This central region 437, which may have smaller dimensions than the central region described above, has two ends of the connector (substantially transversal to the chain 405) concave in correspondence of two gear wheels 440a and 440b, which are suitable to rotate about a respective pin 445a and 445b (the two gear wheels 440a and 440b and the pins 445a and 445b are also being included in the apparatus).

In the example at issue, one of the two gear wheels 440a and 440b, for example the gear wheel 440a is operated by an actuator, such as an electric motor 450 in such a way to move the auxiliary chain 435 around the central region 437, while the wheel 440b is idle. However, in alternative embodiments according to the present invention (not shown), the gear wheels 440a and 440b may be both idle or at least one be motorized. In a further embodiment (also not shown), cylindrical wheels (i.e., without teeth) idle and not motorized are provided, which are adapted to passively assist the running of the auxiliary chain as in the case previously described (in relation to FIGS. 1-3). Advantageously, it is possible to replace idle cylindrical wheels with one or more motorized gear wheels (and vice versa, replace motorized wheels with idle cylindrical wheels) in case it is necessary an additional mechanical strength provided by the motor (or vice versa, in the case where it is not more necessary such mechanical dragging).

In addition, it is advantageously provided a guide and tensioning element, such as a spiral spring or idler 455 in the running space 430 (inside the inner side wall 425in) substantially adjacent to the central region 437 and opposite to a main portion 430a communicating with the chain 405. The idler 455 is adapted to tighten the chain on the return running path 405 thereof aiding a correct and quiet engagement with the idle wheel 440b.

Figure 5:
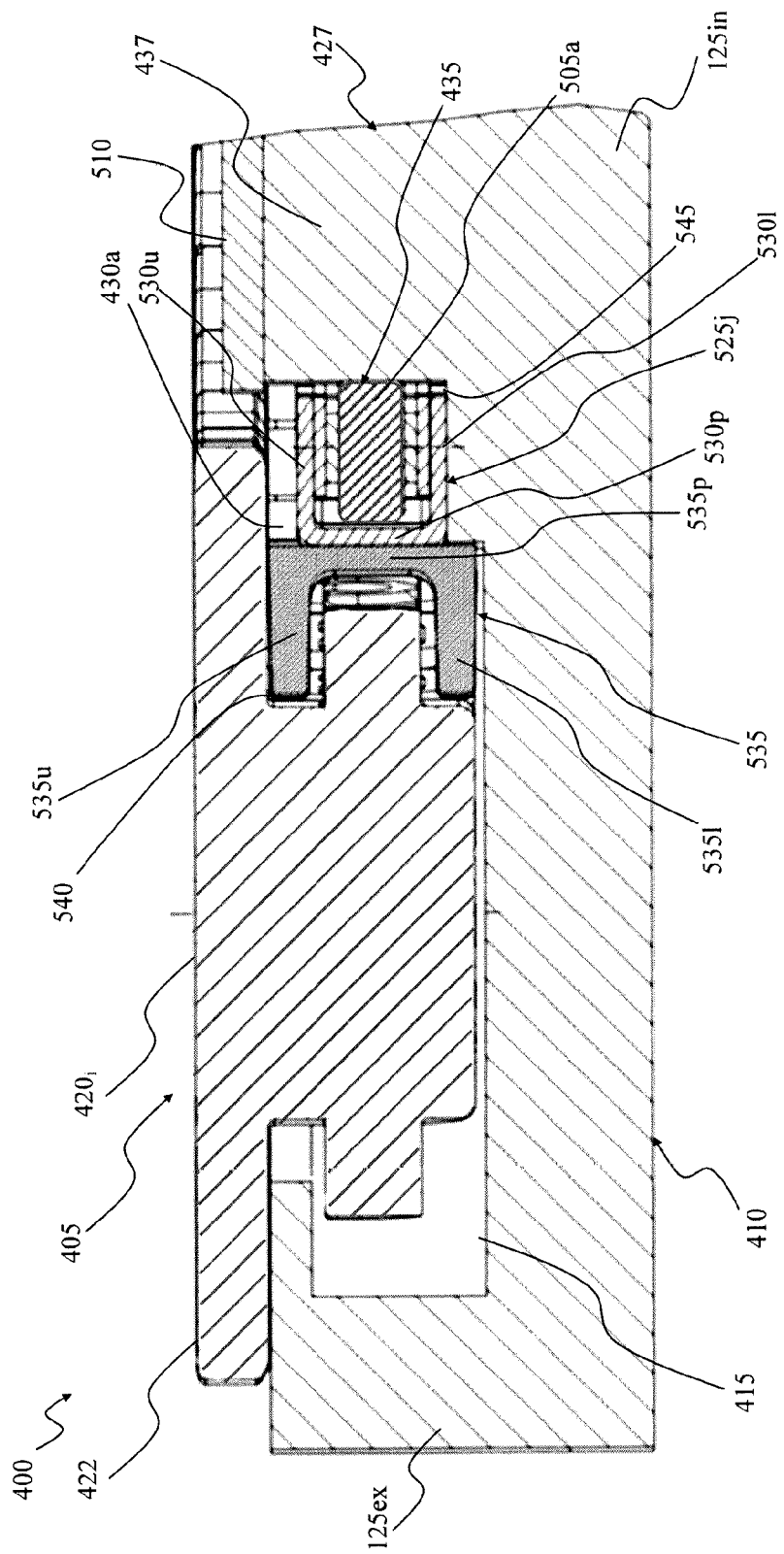
FIG. 5 is a cross sectional view of the curved portion of articles conveyor of FIGS. 4A and 4B.

Considering now also FIG. 5, which is a cross-sectional view of the curved portion of the articles conveyor 400 of FIGS. 4A and 4B, the auxiliary chain 435 comprises a plurality of contact elements 535. Each contact element 535 has a cross section substantially "C"-shaped adapted to engage with a lower portion of the side surface 540 of the chain 405. In fact, this lower portion of the side surface 540 of the chain 405 has a cross section substantially with the shape of a "T" rotated by 90° counter-clockwise. Therefore, the contact element 535 allows obtaining a sufficient cohesion to assist the movement of the chain 405 by reducing a friction force due to movement in the curved portion.

In greater detail, each contact element 535 comprises a fixing portion 535p through which it is fixed to a main wall

530p (for example, by overmolding or gluing) of a corresponding mask 525j mounted to the chain 435 (in a manner similar to the case previously described). From opposite ends of the fastening portion 535p two contact portions 535u and 535l protrude, which are substantially parallel to the mounting walls 530u and 530l of the mask 525j, but they extend in a direction opposite to the latter. This conformation of the contact element 535 allows obtaining a sufficiently wide cohesion region between it and the lower portion of the side surface 540 of the chain 405.

Also in the case of the auxiliary chain 435, it should be noted that it is possible to replace worn-out contact elements 535 simply by removing the corresponding mask 525$_j$ and replacing them with new ones, thus without the need for replacing the whole auxiliary chain 435 (thus lowering maintenance times and costs).

Again, in further embodiments of the present invention (not shown), each contact element 535 may be removably coupled to the corresponding mask 525$_j$ in order to allow substituting worn-out contact element 535 more easily (and cheaply).

In general, contact elements may be provided having any conformation suitable to obtain a sufficient cohesion with the side wall of the modules of the chain in such a way to transfer the point of application of the frictional forces between the rollers of the auxiliary chain and a side wall of the central region.

During operation of the conveyor 400, the auxiliary chain 435 is rotated by the motor 450 so that a portion thereof in contact with the chain 405 moves in the same direction in which the chain 405 is dragged, while the rollers 505a and 505b of the chain 435 are in contact with the side wall 545 of the central region 437 or engaged with the teeth of the gear wheels 440a and 440b. The side surfaces 540 of the modules 420i together define a chain side surface of the chain 405. A portion chain side surface of the chain 405 running trough the curved portion of the conveyor 400 results to be (simultaneously) in contact with (i.e., adhere to) the contact elements 535 of the auxiliary chain 435 in the main portion 430a (with each contact elements 535 that contacts at least one side surfaces 540), thus obtaining a substantially continuous (lateral) contact between the chain 405 and the auxiliary chain 435 in the curved portion of the conveyor 400 (as shown in FIG. 4A).

Also in this case, a substantially transversal contact between side surfaces 540 of the modules 420$_i$ and the contact elements 535 of the auxiliary chain 435, the auxiliary chain 435 is prevented from oscillating transversally to its movement direction (which could reduce the benefits granted by the auxiliary chain 135).

In this way—beyond having the advantage of suppressing, or at least reducing, the friction in the curved portion as previously described—the movement of the chain 405 is adjusted by movement of the auxiliary chain 435. Advantageously, the rotation speed of the auxiliary chain defined by the electric motor 450 can be sized in such a way to compensate for the transversal components of the dragging of the chain 405 that arise when the chain 405 passes through the curved portions of the support structure 410 and in order to improve the movement of the chain 405, making it more uniform (i.e., with a pace without pulses throughout the articles conveyor 400).

It should be noted that the motorized auxiliary chain 435 is particularly advantageous in the curved portions, which develop at least in part along an ascending path (for example, in the case of ramp or spiral portions) on which the articles conveyor 400 is disposed. In this case, the motor 450 allows counteracting more effectively also the weight associated with the chain 405 and with the articles transported by it, reducing a corresponding effort undergone by the actuator of the chain 405.

In an alternative embodiment (not shown) according to the present invention, there is provided a motor-driven auxiliary chain with coupling elements adapted to slide on the side wall of the central region. For example, the auxiliary chain may be provided with non-idle rollers (similar to a chain used for the actuation of a bicycle); such rollers not idly rotatable are adapted to intermesh with the teeth of the gear wheels and to crawl in contact with the side wall of the central region (rather than roll on the same). Alternatively, coupling elements of different types may be provided, for example, skate elements (shaped to intermesh with the teeth of the gear wheels). Advantageously, these coupling elements suitable to slide on the side wall of the central region and the latter are formed in materials whose dynamic contact causes a low coefficient of kinetic friction, for example, the side wall of the central region can be formed in a suitable polymer as a high density polyethylene, while the coupling elements can be formed in a suitable metal such as steel or bronze. The motorized auxiliary chain provided with such coupling elements allows reducing the friction in a fashion somewhat similar to the embodiments previously described, at the same time with a lower manufacturing cost compared to the embodiments provided with coupling elements adapted to roll. In addition, it is possible to provide lubrication elements to lubricate the side surface of the central region in order to further reduce the friction between the coupling members and sliding the side wall of facilitating the running of the auxiliary chain.

In alternative embodiments (not illustrated), a mechanical force required for the rotation of one (or more) gear wheel can be derived by an actuator already available (such as the traction motor of the chain) through a transmission pulley or by a motor shaft through a connection coupling with a pinion spindle connected to the gear wheel to rotate in place of the electric motor.

Although in the accompanying figures are illustrated curvilinear portions of conveyors such as to perform curves of angles of approximately 90°, alternative embodiments of the present invention may be adapted to curvilinear portions of conveyors such as to perform curves of either smaller or greater angles (for example, with angles between a few degrees and 360°).

It is apparent that in conveyors comprising more curvilinear portions is possible to provide a sequence of auxiliary chains, with each auxiliary chain arranged in conjunction with a corresponding curved portion. Furthermore, both idle-type auxiliary chains and motorized-type auxiliary chains may be used is in a same articles conveyor. Advantageously, motorized auxiliary chains may be arranged at "critical" curvilinear portions to actively assist the movement of the chain, as well as to cancel (or reduce) the frictional force, while idle auxiliary chains may be arranged at other curvilinear portions of the conveyor. For example, considering a spiral segment of a conveyor, idle-type auxiliary chains may be arranged in a initial curvilinear portion of the spiral segment, motorized-type auxiliary chains may be arranged in a final curvilinear portion of the spiral segment and, according to the length of the spiral segment, also in curved intermediate portions—in order to reduce the tensile stress on the terminal section of the transport chain in correspondence of a motor pinion adapted to intermesh with the transport chain.

Furthermore, it should be noted that the embodiments described associated to a mat chain can be applied to a slatted chain and, vice-versa, the embodiments described associated to a slatted chain can be applied to a mat chain. In general, the embodiments of the present invention can be applied to an articles conveyor comprising a chain of any type known in the art. Finally, other embodiments according to the present invention provide an apparatus comprising the auxiliary chain, the central region, the circuit or the running region and any geared chains, pins and actuator(s). Such assembly can be designed to match with curvilinear portions of articles conveyors to be implemented or already implemented in a manufacturing line, in a simple and economical way.

The invention claimed is:

1. An apparatus for assisting the movement of a transport chain in correspondence of a curve of a transport path of an articles conveyor, the transport chain including a plurality of modules each module being coupled to adjacent modules in order to form a loop, and wherein top surfaces of the coupled modules define a transport surface for supporting articles to be transported and a side surface define a chain side surface of the chain, said apparatus comprising:
    at least one auxiliary chain arranged in a curvilinear running region corresponding to a transport path curve of an articles conveyor including a transport chain, said at least one auxiliary chain including a plurality of contact elements, each contact element being adapted to laterally contact to the transport chain, some of said plurality of contact elements simultaneously laterally contacting a portion of said at least one auxiliary chain running through the running region at a same running speed as the transport chain.

2. The apparatus according to claim 1, wherein the running region comprises a main portion opening towards the transport chain so that a section of the auxiliary chain arranged in said main portion comprising part of said plurality of contact elements faces a chain side surface of the transport chain.

3. The apparatus according to claim 2, wherein the running region is a closed path.

4. The apparatus according to claim 1, wherein the running region delimits a central region adapted to serve as shoulder for said at least one auxiliary chain.

5. The apparatus according to claim 4, wherein at opposite ends of the central region are provided gears adapted to assist a movement of the at least one auxiliary chain.

6. The apparatus according to claim 5, wherein at least one of the gears is provided with teeth having a pitch and a shape adapted to mesh with the auxiliary chain and is set in rotation by an actuator.

7. The apparatus according to claim 1, including an element tensioning the at least one auxiliary chain in a return portion of the curvilinear running region.

8. The apparatus according to claim 1, wherein the at least one auxiliary chain comprises a sequence of unitary elements, each unitary element having a couple of pins inserted into a through hole of corresponding coupling elements and a couple of binding elements coupled with portions of the pins protruding from the coupling elements by inserting said protruding portions of the pins in respective through holes formed in opposite ends of each binding element, and a plurality of couples of additional binding elements, each adapted to be coupled with the protruding portions of a pin of the unitary element and with the protruding portions of a further pin of a further adjacent unitary element, by means of respective through holes formed in opposite ends of each further binding element.

9. The apparatus according to claim 8, wherein the coupling elements roll on a side portion of a central region of the transport chain.

10. The apparatus according to claim 8, wherein the coupling elements slide on a side portion of a central region of the transport chain.

11. The apparatus according to claim 8, wherein the at least one auxiliary chain further includes a plurality of cover elements, each cover element comprising a main wall and two mounting walls, which extend from edges of greater extent of the main wall in a direction substantially transversal to the same, each mounting wall comprising a pair of through holes adapted to allow an insertion of the protruding portion of the pin of the unitary element and of the protruding portion of the pin of the further unitary element in the sequence.

12. The apparatus according to claim 11, wherein the plurality of contact elements is formed on the main wall of each cover element.

13. An articles conveyor comprising:
    a support structure equipped with a housing delimited by at least one side wall, said housing housing a transport chain and directing movement of the transport chain; and
    at least one apparatus according to claim 1, said apparatus being embedded in the at least one side wall of said conveyor in correspondence of a curved portion of the housing, said running region being disposed adjacent to the transport chain and said contact elements of the at least one auxiliary chain being adapted to contact a side surface of the transport chain running at a same running speed as the at least one auxiliary chain.

14. The apparatus according to claim 1, in which said at least one auxiliary chain adheres to the side surface of the transport chain which drags the auxiliary chain at the same speed as the transport chain.

15. The apparatus according to claim 1, in which said at least one auxiliary chain is driven by an electric motor at the same speed as the transport chain.

* * * * *